(12) United States Patent
Chaudhary et al.

(10) Patent No.: US 7,111,214 B1
(45) Date of Patent: Sep. 19, 2006

(54) CIRCUITS AND METHODS FOR TESTING PROGRAMMABLE LOGIC DEVICES USING LOOKUP TABLES AND CARRY CHAINS

(75) Inventors: Kamal Chaudhary, San Jose, CA (US); Sridhar Krishnamurthy, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 581 days.

(21) Appl. No.: 10/268,877

(22) Filed: Oct. 9, 2002

(51) Int. Cl.
*G01R 31/28* (2006.01)
*G06F 11/00* (2006.01)
*G06F 7/38* (2006.01)
*H01L 25/00* (2006.01)

(52) U.S. Cl. .................. 714/725; 714/724; 714/736; 326/39; 326/41

(58) Field of Classification Search ............. 714/736, 714/725, 726, 727, 729, 819, 823; 326/40–41, 326/39, 47
See application file for complete search history.

(56) References Cited

U.S. PATENT DOCUMENTS 6,118,300 A * 9/2000 Wittig et al. ............... 326/41
6,326,808 B1 * 12/2001 Fisk et al. .................. 326/41

2002/0188903 A1 * 12/2002 Chu et al. .................. 714/738
2003/0107937 A1 * 6/2003 Williams et al. ........... 365/221

OTHER PUBLICATIONS

IBM Technical Disclosure Bulletin, Memory Self Test, Oct. 1, 1991, IBM, Issue 5, vol. 34, pp. 185-186.*
Xilinx, Inc.; "Virtex-II Platform FPGA Handbook"; published Dec. 2000, available from Xilinx, Inc,, 2100 Logic Drive, San Jose, California 95124; pp. 33-75.

* cited by examiner

*Primary Examiner*—Albert DeCady
*Assistant Examiner*—John J. Tabone, Jr.
(74) *Attorney, Agent, or Firm*—Lois D. Cartier; LeRoy D. Maunu

(57) ABSTRACT

Circuit implementations and test methods enable the testing of lookup table (LUT) input paths, "stuck at" memory cell values, and carry chains. One method includes storing a first bit pattern in each LUT, configuring the carry chain to perform a wide AND function of the LUT outputs, and cycling the inputs of each LUT while comparing the carry chain output to an expected value and reporting the PLD faulty if a difference is detected. The carry chain is configured to perform a wide OR function, and the cycling step is repeated. The bit pattern within each LUT is changed to the complement of the first bit pattern by providing a series of shift commands or by otherwise storing new values in the LUT, and the configuring and cycling steps are repeated. The invention also provides PLD circuit implementations that can be used to perform the described methods.

40 Claims, 8 Drawing Sheets

CIRCUITS AND METHODS FOR TESTING PROGRAMMABLE LOGIC DEVICES USING LOOKUP TABLES AND CARRY CHAINS

FIELD OF THE INVENTION

The invention relates to Programmable Logic Devices (PLDs). More particularly, the invention relates to efficient circuits and methods for testing PLDs that utilize the lookup tables and carry chains of some commercially available PLDs.

BACKGROUND OF THE INVENTION

Programmable logic devices (PLDs) are a well-known type of digital integrated circuit that can be programmed to perform specified logic functions. One type of PLD, the field programmable gate array (FPGA), typically includes an array of configurable logic blocks (CLBs) surrounded by a ring of programmable input/output blocks (IOBs). The CLBs and IOBs are interconnected by a programmable interconnect structure. Some FPGAs also include additional logic blocks with special purposes (e.g., DLLs, RAM, and so forth).

The CLBs, IOBs, interconnect, and other logic blocks are typically configured (programmed) by loading a stream of configuration data (bitstream) into internal configuration memory cells that define how the CLBs, IOBs, and interconnect are configured. The configuration data can be read from memory (e.g., an external PROM) or written into the FPGA by an external device. The collective states of the individual memory cells then determine the function of the FPGA. Some PLDs also support partial reconfiguration, i.e., loading a partial bitstream that can change the functionality of a portion of the PLD while other portions of the PLD continue to function.

One such FPGA, the Xilinx Virtex®-II FPGA, is described in detail in pages 33–75 of the "Virtex-II Platform FPGA Handbook", published December, 2000, available from Xilinx, Inc., 2100 Logic Drive, San Jose, Calif. 95124, which pages are incorporated herein by reference. (Xilinx, Inc., owner of the copyright, has no objection to copying these and other pages referenced herein but otherwise reserves all copyright rights whatsoever.) A simplified diagram of the Virtex-II CLB is shown in FIG. 1.

As shown in FIG. 1, a Virtex-II CLB includes four similar slices S0–S3. Each slice includes two 4-input lookup tables (LUTs) 101, 102 that can be configured to operate in any of three modes: lookup table mode, in which the LUT can provide any function of up to four inputs; RAM mode, in which the LUT provides a single or dual-port RAM of 8 or 16 bits; or shift mode, in which the LUT functions as a shift register up to 16 bits deep.

When in RAM mode, the write process is controlled by control signal generator 105, which provides control signal CS (which in RAM mode is a write strobe signal) to the LUTs (101, 102). (In the present specification, the same reference characters are used to refer to terminals, signal lines, and their corresponding signals.) Control signal generator 105 derives control signal CS from the clock CLK and clock enable CE input signals to the CLB. The RAM input data is supplied to the DI input terminal of each LUT 101, 102 by direct input terminals RAM_DI_1 and RAM_DI_2 via multiplexers DM1, DM2, respectively. Multiplexers DM1, DM2 are controlled by configuration memory cells (not shown).

When in shift mode, the shift process is controlled by the same control signal CS, which in shift mode is a shift enable signal. The shift input data for LUT 101 is supplied to the DI input terminal of LUT 101 from CLB input terminal ShiftIn via multiplexer DM1. The shift data output for each LUT is supplied by dedicated shift output terminal SR15. The shift input data for LUT 102 is supplied to the DI input terminal of LUT 102 from the shift out terminal SR15 of LUT 101 via multiplexer DM2.

Each LUT 101, 102 output signal OUT is read from the location in the LUT memory cell array addressed by the 4 input signals IN1–IN4. LUT output signal OUT is provided to an associated multiplexer MUX1, MUX2, which in turn provides a data input to an associated 1-bit register 103, 104. Direct input terminals Reg_DI_1, Reg_DI_2 also drive multiplexers MUX1, MUX2, respectively, allowing independent signals to be loaded into the registers via these direct input terminals. Multiplexers MUX1 and MUX2 are controlled by configuration memory cells (not shown). Registers 103, 104 are controlled by the clock CLK and clock enable CE signals and by other memory control signals (not shown).

The Virtex-II CLB also includes carry logic associated with each LUT/register pair. The output terminal OUT of each LUT 101, 102 controls a carry multiplexer CM1, CM2, which passes one of an externally supplied signal CM_DI_1, CM_DI_2 and an associated carry-in signal CIInt, CarryIn to a next carry multiplexer in the chain.

FIG. 2 is a simplified diagram of a portion of the Virtex-II CLB of FIG. 1, showing only those elements used in known test processes for testing the input structures of the LUT 201. The diagram of FIG. 2 includes LUT 201 and register 203, coupled as shown in FIG. 1.

FIG. 3 shows how several copies of the circuit of FIG. 2 can be used to test a portion of the LUT input structures using known testing methods. A "pseudo shift register" is created using the LUTs and registers of the CLB, each stage of the pseudo shift register including one LUT and its associated register. For example, a first stage of the pseudo shift register includes LUT 201a and register 203a, a second stage includes LUT 201b and register 203b, and an nth stage includes LUT 201n and register 203n. The LUTs are configured to implement buffers or inverters. Each register captures the output signal OUT from its associated LUT, and passes the registered value to the next LUT in the chain at each enabled clock signal.

To perform the test, a shift data input signal Test_In is applied to one input terminal of LUT 201a. Register 203a is enabled by clock enable signal CE, and clocked by a clock signal CLK to latch the output from LUT 201a. With each subsequent clock edge, the signal passes through an additional stage of the pseudo shift register. After n active clock edges, the test output signal Test_Out appears at the output terminal of the nth register 203n. This value is compared to an expected value. If the value is correct, the LUT input paths, registers, and interconnect resources used in this particular implementation are assumed to be functional.

However, this test method has its drawbacks. For example, suppose each LUT has K input terminals. Suppose further that each input terminal includes a wide multiplexer that selects one of M input signals from the interconnect structure to provide to the LUT. Using known test methods, at least K×M (K times M) test patterns are needed to determine whether or not each LUT input is fault-free. For example, in a Virtex-II LUT, K is 4 and M is 36. Thus, 144 different test patterns are required to test the input structures of a Virtex-II LUT.

Clearly, testing a PLD can be much more time-consuming than testing a comparably-sized non-programmable device, because of the number of possible configurations for each LUT. In fact, testing a PLD can be so time-consuming that testing becomes a greater expense than the actual manufacturing costs of the device.

Therefore, it is desirable to provide circuit implementations and test methods that reduce the time required to test the various structures in PLD LUTs.

Further, the test methods described in connection with FIGS. 2 and 3 do not necessarily detect "stuck at" faults in the memory cells implementing the LUT. If a memory cell is "stuck at" (i.e., permanently storing) a value that is the same as the value expected by the test, the fault is not detected. Therefore, additional "stuck at" tests are required to check for this type of defect.

Hence, it is further desirable to provide circuit implementations and test methods that can simultaneously test the input structures and the memory cells of a LUT, thereby reducing the test time and thus the final cost of the PLD.

SUMMARY OF THE INVENTION

The invention provides circuit implementations and test methods that reduce the time required for testing input structures in PLD lookup tables (LUTs) while simultaneously performing "stuck at" tests. These implementations and methods enable the testing of the LUT data input paths, high and low "stuck at" values for the memory cells of the LUT, the carry chain functionality, and (in some embodiments) the LUT shift function and paths, all within a single test flow.

A first aspect of the invention provides methods for testing PLDs that utilize the LUTs and carry chains to efficiently test various structures within and between the LUTs. The LUTs have an associated carry chain, wherein each carry multiplexer is controlled by one of the LUTs. One embodiment of the invention includes the steps of storing a first bit pattern in each LUT, configuring the carry chain to perform a wide AND function of the output signals of the LUTs, and then cycling the inputs of each LUT through all possible input combinations while comparing the carry chain output signal to an expected value and reporting the PLD faulty if the carry chain output signal differs from the expected value. The carry chain is then configured to perform a wide OR function, and the inputs of the LUTs are again cycled through all possible input combinations while comparing the carry chain output signal to an expected value and reporting the PLD faulty if the carry chain output signal differs from the expected value.

A second bit pattern is then stored in each LUT, where the second bit pattern is the complement (the "opposite") of the first bit pattern. In one embodiment, where the LUTs are configured to form a recirculating shift pattern through the LUTS, the first bit pattern is changed to the second bit pattern within each LUT by providing a series of shift commands to each LUT. The bit patterns and the number of shift commands are selected such that the second bit pattern is the complement of the first bit pattern. In another embodiment, the LUTS are in RAM mode, and the second bit pattern is stored in each LUT using a RAM load command. In yet another embodiment, the second bit pattern is stored in each LUT using partial reconfiguration (e.g., by loading a partial configuration bitstream that reconfigures only the LUTS) or by reconfiguring the entire PLD.

The steps of configuring a wide AND, cycling and comparing, configuring a wide OR, and cycling and comparing again, are then repeated.

In some embodiments, the carry chain is first configured to perform a wide OR function and the cycling/comparing test is performed, then the carry chain is configured to perform a wide AND function and the cycling/comparing test is performed again. In some embodiments, where the carry chain is not thoroughly tested, only the tests associated with the wide AND function or only the tests associated with the wide OR function are performed.

In some embodiments, the first bit pattern configures each LUT to perform an XOR function and the second bit pattern configures each LUT to perform an XNOR function. These patterns have the advantage of frequently changing low values to high values, and high values to low values, during the cycling steps. For example, in one embodiment each LUT has 4 data inputs, and hence a total of 16 (i.e., 2**4, or 2 to the 4th power) memory cells. In this embodiment, the first bit pattern is 0x6996 (hex value 6996, or 0110100110010110), while the second bit pattern is 0x9669 (1001011001101001). To replace the first bit pattern by the second bit pattern, eight shift commands are applied to the LUTs.

A second aspect of the invention provides circuit implementations for PLDs that can be used to implement some of the methods just described. A first embodiment includes at least two LUTs configured in shift mode, at least two carry multiplexers having select terminals coupled to the output terminals of the LUTs, and an inverter. The LUTs have shift in and shift output terminals coupled to create a recirculating shift path through the LUTS. The corresponding data input terminals of the LUTs are coupled together, as are the shift control terminals.

The two carry multiplexers are coupled in series to form a carry chain. Each carry multiplexer has a first data input coupled to an AND/OR input terminal of the circuit. The second terminal of one carry multiplexer is coupled to the AND/OR input terminal through the inverter. The output terminal of the other carry multiplexer is the carry out terminal of the carry chain and also the output terminal of the circuit.

Some embodiments of the invention include a logical XOR gate and a third LUT configured in shift mode and having data input and shift control terminals coupled to those of the other LUTS. The third LUT is inserted into the recirculating shift path formed by the other two LUTs. The output terminal of the third LUT is coupled to one input terminal of the logical XOR gate, while the carry out terminal of the carry chain is coupled to the other input terminal of the logical XOR gate. The output terminal of the logical XOR gate provides an error detect output signal for the circuit. In other words, the logical XOR gate performs a comparison between the expected LUT output data (provided by the third LUT) and the data provided by the carry chain. If the two values differ, the output of the logical XOR gate goes high, signaling that an error has occurred.

Some embodiments of the invention include a control signal generator having clock and clock enable input terminals and an output terminal coupled to the shift control terminals of each LUT.

Other embodiments can include two or more columns of LUTs, each configured as described above, and a logical OR gate that combines the error detect outputs of each column to form a single error detect output signal.

BRIEF DESCRIPTION OF THE DRAWINGS

The present invention is illustrated by way of example, and not by way of limitation, in the following figures, in which like reference numerals refer to similar elements.

DETAILED DESCRIPTION OF THE DRAWINGS

The present invention is believed to be applicable to a variety of PLDs. While the present invention is not so limited, an appreciation of the present invention is presented by way of specific examples, in this instance with circuit implementations and methods targeted to Virtex-II PLDs available from Xilinx, Inc. Hence, in the following description, numerous specific details are set forth to provide a more thorough understanding of the present invention. However, it will be apparent to one skilled in the art that the present invention can be practiced in other PLDs and without these specific details.

Figure 4:
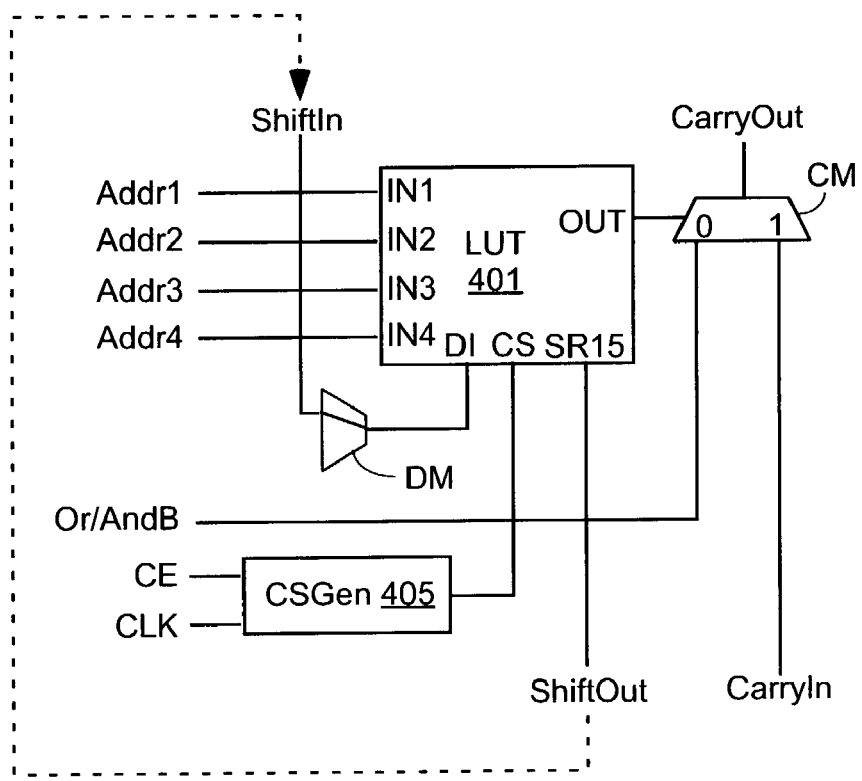
FIG. 4 shows a portion of the CLB of FIG. 1 that can be used to efficiently test various LUT structures.

FIG. 4 shows a portion of a Virtex-II configurable logic block (CLB) that can be used to efficiently test various LUT structures, as will be described in conjunction with later figures. The diagram of FIG. 4 includes LUT 401, carry multiplexer CM, control signal generator 405, and multiplexer DM, coupled together as shown and described in conjunction with FIG. 1. Note that the circuit of FIG. 4 is used to test the LUT structures and functions including the shift function. In other embodiments of the invention, the shift function is not available or is not tested, and only the LUT and carry multiplexer are used.

In the embodiment of FIG. 4, LUT 401 is configured to function in shift mode. The ShiftOut signal from the LUT is coupled (through other LUTs, not shown) to form a "recirculating" shift path back to the ShiftIn terminal. Multiplexer DM is configured to pass the ShiftIn value to the direct input terminal of the LUT.

Control signal generator 405 generates the shift control signal from a clock signal CLK and a clock enable signal CE and provides the shift control signal CS to the LUT. Each time signal CLK provides an active edge while signal CE is at an enabling value, a one-bit shift occurs in LUT 401, i.e., the bit values in the LUT memory cells shift "downward" (from input signal DI to output signal SR15) by one bit.

For example, suppose a value of 0110100110010110 (0x6996 or hex value 6996) is stored in LUT 401. (The most significant bit, SR15, is provided at the left end of the bit string.) After receipt of one shift command, the LUT stores a value of 1101001100101100, or 0xD32C. After a total of eight shift commands, the stored value has changed to 1001011001101001, or 0x9669.

Note that the bit patterns for the two values 0x6996 and 0x9669 are complementary, i.e., each high bit in the first bit pattern is low in the second bit pattern, and each low bit in the first bit pattern is high in the second bit pattern. Numerous such patterns exist, particularly when the number of shift commands is selected to facilitate the production of a complementary bit pattern. Elementary examples include any pattern of alternating ones and zeros shifted by any odd number of bits (e.g., the pattern 010101 ... shifted by one), and any pattern of alternating groups of bits when shifted by the number of bits in each group (e.g., the pattern 111000111000 shifted by three, or the pattern 0000000011111111 shifted by eight).

Note that FIG. 4 shows the portions of a Virtex-II CLB used to implement the methods of the invention. However, the methods can be implemented in other CLBs using only the LUT 401 and carry multiplexer CM portions of FIG. 4.

Figure 5:
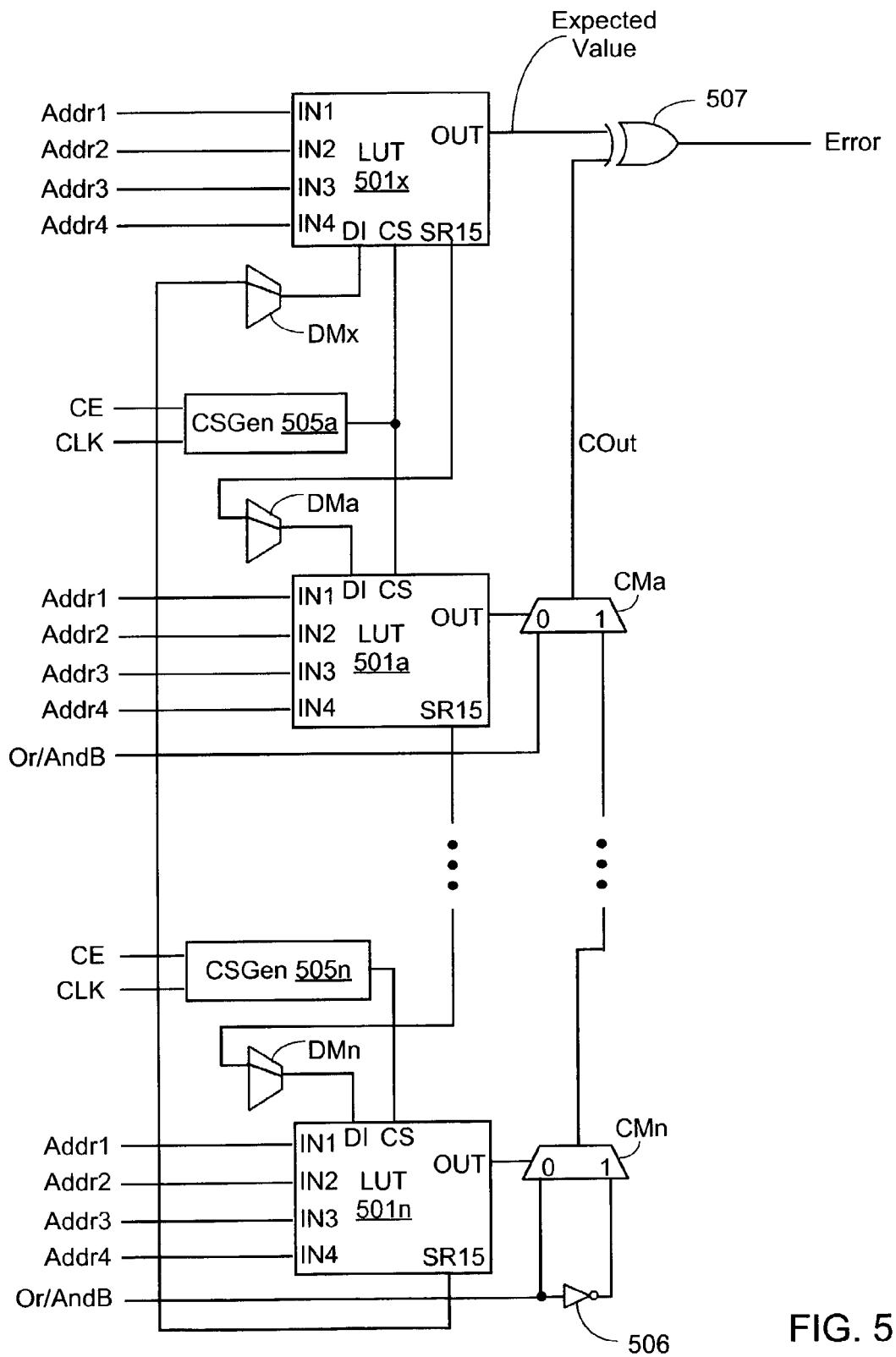
FIG. 5 shows a first circuit implementation based on the circuit of FIG. 4 that can be used in a LUT testing process.

FIG. 5 shows a first circuit implementation that can be used in a LUT testing process as described herein. The circuit implementation of FIG. 5 includes two or more copies of the circuit of FIG. 4, plus an additional LUT 501x, DM multiplexer DMx, logical XOR gate 507, and inverter 506. In one embodiment, LUTs 501x and 501a–501n comprise all of the LUTs in one column of CLBs. LUTs 501x and 501a–501n are all configured in shift mode.

LUTs 501a–501n and their associated carry multiplexers CMa–CMn, control signal generators 505a–505n (each of which is shared by two LUTs in the Virtex-II CLB), and direct input multiplexers DMa–DMn together form a circuit that provides a carry out signal COut. Carry out signal COut is the output of the carry chain, each stage of which is controlled by one of LUTs 501a–501n. The value provided to the carry chain by each LUT is the value stored in one memory cell in the LUT, the memory cell selected by the values on the input terminals IN1–IN4 of each LUT. Thus, the carry chain output signal represents a combination of values provided by all LUT input terminals IN1–IN4, the addressed LUT memory cell in each LUT, and the carry multiplexer associated with each LUT. By cycling through all possible values on the input terminals IN1–IN4, all the memory cells in LUTs 501a–501n can be tested.

By configuring the carry chain to perform both an AND function and an OR function of the LUT output signals, the carry chain can also be fully tested. To configure the carry chain to perform a wide AND function, signal Or/AndB is driven low. Signal Or/AndB is inverted by inverter 506, causing the "1" input of carry multiplexer CMn to be high. Thus, the output terminal of carry multiplexer CMn is the same as the value on the OUT terminal of LUT 501n. A low value on the OUT terminal of any of LUTs 501a–501n causes the carry out signal COut to go low.

To configure the carry chain to perform a wide OR function, signal Or/AndB is driven high. Signal Or/AndB is inverted by inverter 506, causing the "1" input of carry multiplexer CMn to be low. Thus, the output terminal of carry multiplexer CMn is the complement of the value on the OUT terminal of LUT 501n. A low value on the OUT terminal of any of LUTs 501a–501n causes the carry out signal COut to go high. Thus, the carry chain implements an OR function with input signals inverted from the signals on the OUT terminals of LUTs 501a–501n.

To test the shift path, sufficient shift commands are applied to replace a first bit pattern stored in each LUT by a second bit pattern that is complementary to the first bit pattern. For example, a bit pattern of 0110100110010110

(0x6996 or hex value 6996) can be shifted eight times to provide the bit pattern 1001011001101001, or 0x9669. In a 4-input Virtex-II LUT, the bit pattern 0x6996 performs an XOR function, while the bit pattern 0x9669 performs an XNOR function. By monitoring the carry out signal before, during, and after the shift process, the shift function and path within and between the LUTs can be verified.

The circuit of FIG. 5 also optionally includes elements that provide an expected value for the carry chain output signal, and perform a comparison between the expected value and the carry chain output signal. These elements are LUT 501x, multiplexer DMx, and logical XOR gate 507. LUT 501x is inserted into the recirculating shift path, and the other input terminals (IN1–IN4, DI) are connected in a similar fashion to those of the other LUTs. However, the output of LUT 501x ("Expected Value") is not included in the carry chain. Therefore, a carry chain error or defect, a shift error or defect along the shift path, or a problem with any of the input terminals or memory cells of LUTs 501a–501n causes a difference between the Expected Value and the carry chain output signal COut. Any such difference causes the output of logical XOR gate 507 to go high, indicating that an error has been detected.

Logical XOR gate 507 can be implemented in many different ways, for example, by configuring another LUT of the PLD to perform the XOR function or by using a dedicated circuit included in the PLD for that purpose.

Figure 6:
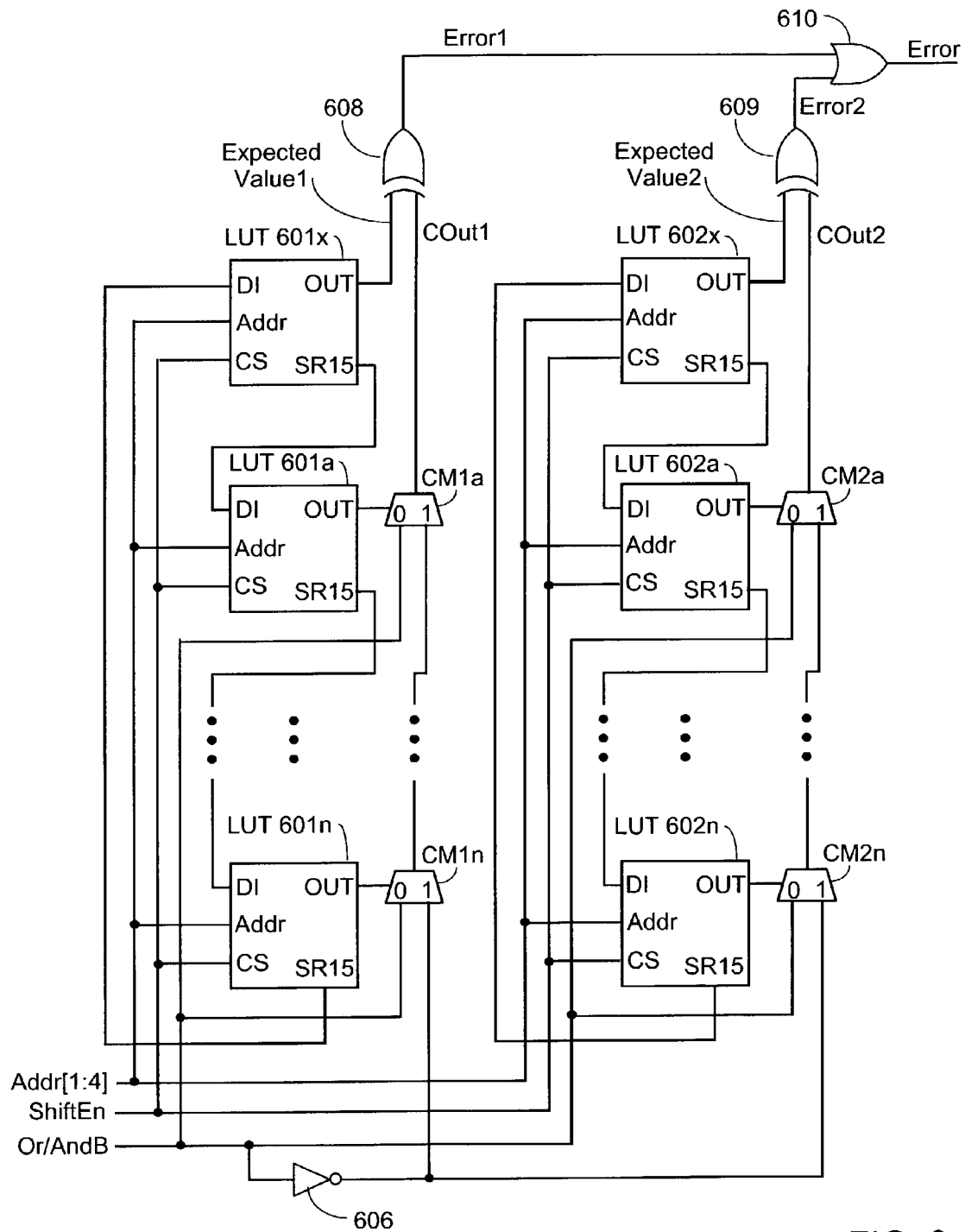
FIG. 6 shows a second circuit implementation based on the circuit of FIG. 4 that can be used in a LUT testing process.

FIG. 6 shows one way in which multiple copies of the circuit of FIG. 5 can be combined to provide a single error detect output signal. Note that FIG. 6 does not include the DM multiplexers or the control signal generators shown in FIG. 5. Therefore, FIG. 6 illustrates a more general circuit implementation than FIG. 5, i.e., an implementation that is not specific to a Virtex-II or similar CLB.

LUTs 601a–601n, 601x and carry multiplexers CM1a–CM1n are coupled as shown in FIG. 5 to provide a first carry out signal COut1. XOR gate 608 provides a high output value to node Error1 if the first carry out value COut1 does not match the expected value provided by LUT 601x. LUTs 602a–602n, 602x and carry multiplexers CM2a–CM2n are coupled as shown in FIG. 5 to provide a second carry out signal COut2. XOR gate 609 provides a high output value to node Error2 if the second carry out value COut2 does not match the expected value provided by LUT 602x. Logical OR gate 610 is driven by signals Error1 and Error2 and provides a high output value if either of these two signals indicates an error by going high.

Logical XOR gates 608, 609 and logical OR gate 610 can be implemented in many different ways, for example, by configuring other LUTs of the PLD to perform the desired functions or by using dedicated circuits included in the PLD for that purpose.

Figure 7:
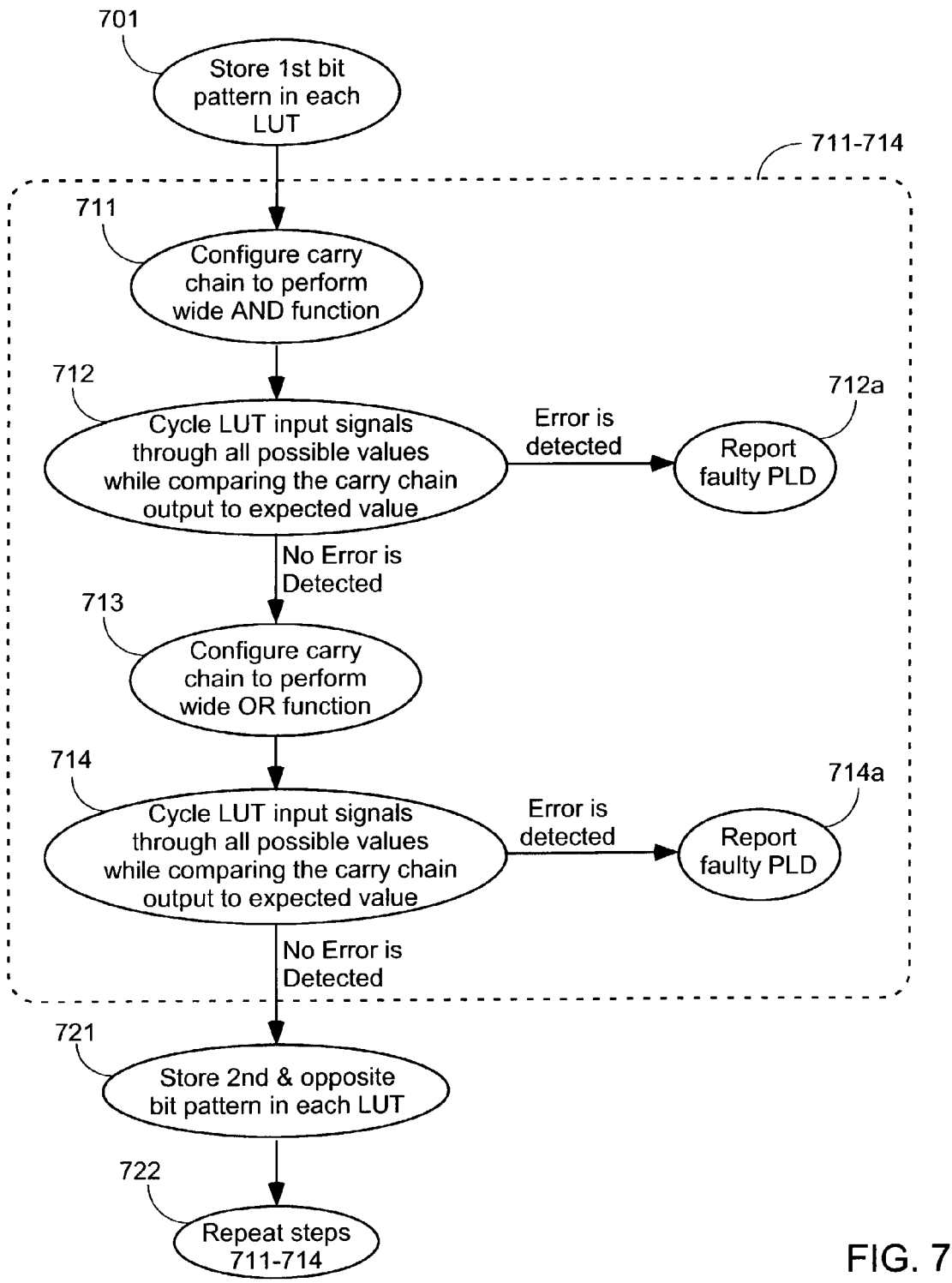
FIG. 7 shows the steps of a first method of testing LUTs in a PLD.

FIG. 7 shows the steps of a first method of testing LUTs in a PLD. The illustrated method is not targeted to any particular PLD.

In step 701, a first bit pattern is stored in each LUT. The bit pattern can be stored, for example, by configuring the entire PLD, by performing a partial reconfiguration that configures a portion of the PLD including the LUTs, or by writing new data to the LUTs using a series of memory write commands while the LUTs are configured in RAM mode.

In step 711, the carry chain is configured to perform a wide AND function. When the circuits of FIGS. 5 and 6 are used to perform the method, the configuration is performed by presenting a low value at the Or/AndB input terminal of the circuit. In other embodiments, configuration memory cells or other methods or structures can be used to configure the carry chain.

In step 712, the K input signals of each LUT are cycled through all 2K (two to the Kth power) possible combinations of values. Thus, each memory cell in the LUT memory array is tested in turn. The order of the values presented to the K input terminals is unimportant, i.e., they need not be in any particular order. In one embodiment, a Grey code implementation is used. While cycling through the 2K input combinations the output of the carry chain is monitored and compared to the expected value. In some embodiments, the monitoring is performed by logic such as the logical XOR gates of FIGS. 5 and 6. If an error is detected, a faulty PLD is reported (step 712a).

In step 713, the carry chain is configured to perform a wide OR function. When the circuits of FIGS. 5 and 6 are used to perform the method, the configuration is performed by presenting a high value at the Or/AndB input terminal of the circuit. In other embodiments, configuration memory cells or other methods or structures can be used to configure the carry chain.

In step 714, the K input signals of each LUT are again cycled through all possible combinations of values while monitoring the output of the carry chain. If an error is detected, a faulty PLD is reported (step 714a).

In step 721, a second bit pattern having complementary values to those of the first bit pattern is stored in each LUT. The second bit pattern can be stored, for example, by reconfiguring the entire PLD, by performing a partial reconfiguration that configures a portion of the PLD including the LUTS, or by writing new data to the LUTs using a series of memory write commands while the LUTs are configured in RAM mode. In a PLD that supports a LUT shift mode, the second pattern can be stored by shifting the values stored in each LUT until the first bit pattern is replaced by an opposite bit pattern. In these embodiments, the LUTs are configured to form a recirculating shift pattern through the LUTS, and the bit patterns and the number of shift commands are selected such that the second bit pattern is the complement of the first bit pattern.

In step 722, steps 711–714 are repeated with the second bit pattern stored in the LUTs.

The use of all possible combinations of values for the LUT input signals ensures that each memory location in each LUT is tested. The use of both AND and OR functions in the carry chain ensures the functionality of the carry chain for passing both high and low values. The use of two complementary bit patterns checks the various circuits for both "stuck at one" and "stuck at zero" conditions. Further, because all four input terminals of each LUT are simultaneously in use while cycling the input signal values, testing of the LUT input terminals can be accomplished in as little as one fourth of the time required by previously known methods.

Note that the steps of FIG. 7 need not be performed in the order shown. For example, the carry chain OR function can be tested before the carry chain AND function, i.e., steps 713–714 can be performed before steps 711–712. If testing the carry chain is not necessary (e.g., the carry chain is adequately tested by other test procedures), the test process can include only the tests associated with the wide AND function (steps 711–712) or only the tests associated with the wide OR function (steps 713–714) for each of the two bit patterns. If a second set of steps (steps 711–712 or steps 713–714) is omitted, the carry chain need not be reconfigured prior to performing the cycling and comparing step.

Figure 8:
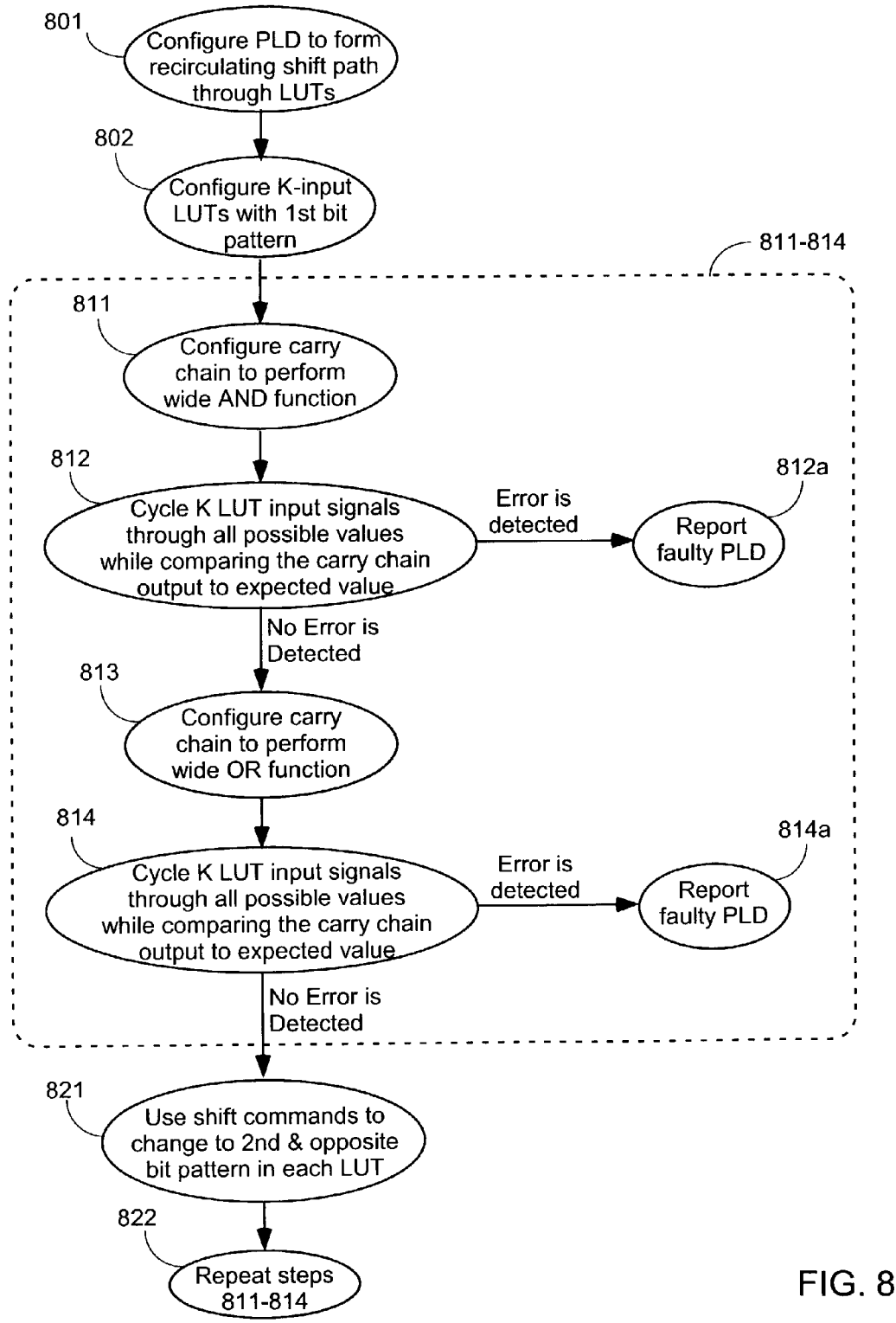
FIG. 8 shows the steps of an exemplary method of testing LUTs in a PLD using shift register mode.

FIG. 8 shows the steps of a second method of testing LUTs in a PLD. The illustrated method is targeted to PLDs that include LUTs having a shift mode.

In step 801, the PLD is configured to form a recirculating shift path through the LUTs (e.g., see FIGS. 4–6). In step 802, the LUTs are configured with a first bit pattern. The configurations of steps 801 and 802 can be performed in any order, or simultaneously. For example, both steps can be performed by loading a single configuration bitstream into the PLD. As another example, the recirculating shift path can be configured with a configuration bitstream, after which the first bit pattern is loaded into the LUTs using partial reconfiguration or a series of memory write commands.

Steps 811–814 are similar to the corresponding steps shown in FIG. 7 and described in conjunction with that figure.

In step 821, shift commands are used to change the first bit pattern in each LUT to a second bit pattern. The bit patterns and the number of shift commands are selected such that the second bit pattern is the complement of the first bit pattern. In step 822, steps 811–814 are repeated with the second bit pattern stored in the LUTs.

The use of the shift command to alter the bit pattern stored in the LUTs ensures that the shift function and shift path are tested in and between all of the LUTs. The use of all possible combinations of values for the LUT input signals ensures that each memory location in each LUT is tested. The use of both AND and OR functions in the carry chain ensures the functionality of the carry chain for passing both high and low values. The use of two complementary bit patterns checks the various circuits for both "stuck at one" and "stuck at zero" conditions. Further, because all four input terminals of each LUT are simultaneously in use while cycling the input signal values, testing of the LUT input terminals can be accomplished in as little as one fourth of the time required by previously known methods.

As in the embodiment of FIG. 7, the steps of FIG. 8 need not be performed in the order shown. For example, the carry chain OR function can be tested before the carry chain AND function, i.e., steps 813–814 can be performed before steps 811–812. If testing the carry chain is not necessary (e.g., the carry chain is adequately tested by other test procedures), the test process can include only the tests associated with the wide AND function (steps 811–812) or only the tests associated with the wide OR function (steps 813–814) for each of the two bit patterns. If a second set of steps (steps 811–812 or steps 813–814) is omitted, the carry chain need not be reconfigured prior to performing the cycling and comparing step.

Figure 9:
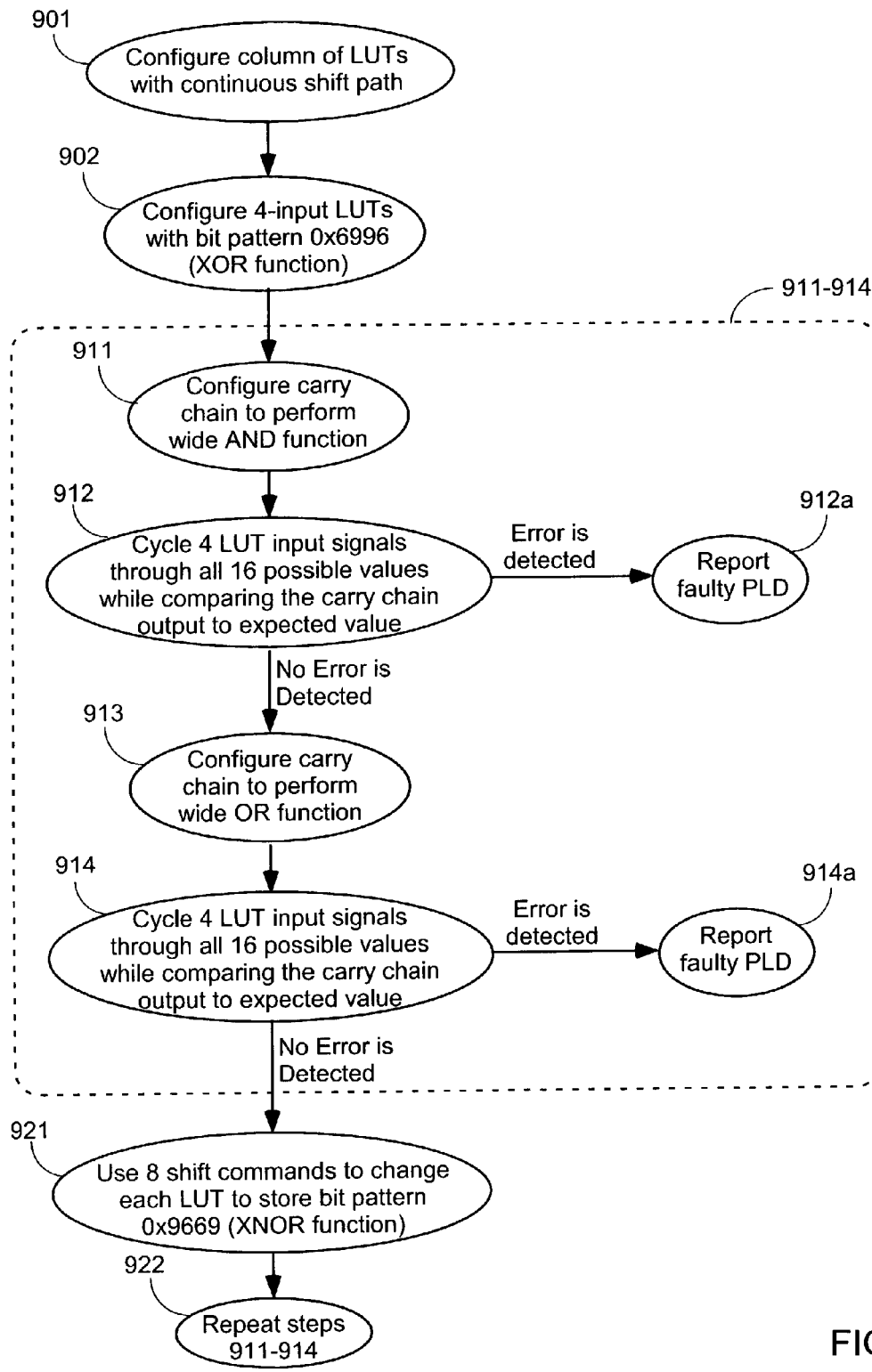
FIG. 9 shows the steps of an exemplary method of testing 4-input LUTs in a Virtex-II PLD using shift register mode.

FIG. 9 shows the steps of an exemplary method of testing 4-input LUTs in a Virtex-II or similar PLD. The Virtex-II LUTs each have four inputs. Specific values for the first and second bit patterns (which are purely exemplary) are provided. The number of shift commands performed (eight in this example) is also purely exemplary, being one of several numbers of shift commands that will function properly to produce a second bit pattern that is a complement of the first bit pattern. However, for the bit patterns used in this example, an 8-bit shift is preferred.

In step 901, a column of 4-input LUTs is configured with a continuous shift path (for example, see FIGS. 5 and 6). In step 902, each 4-input LUT is configured with a first bit pattern 0x6996. In a Virtex-II LUT, this bit pattern implements an XOR function in the LUT.

Figure 1:
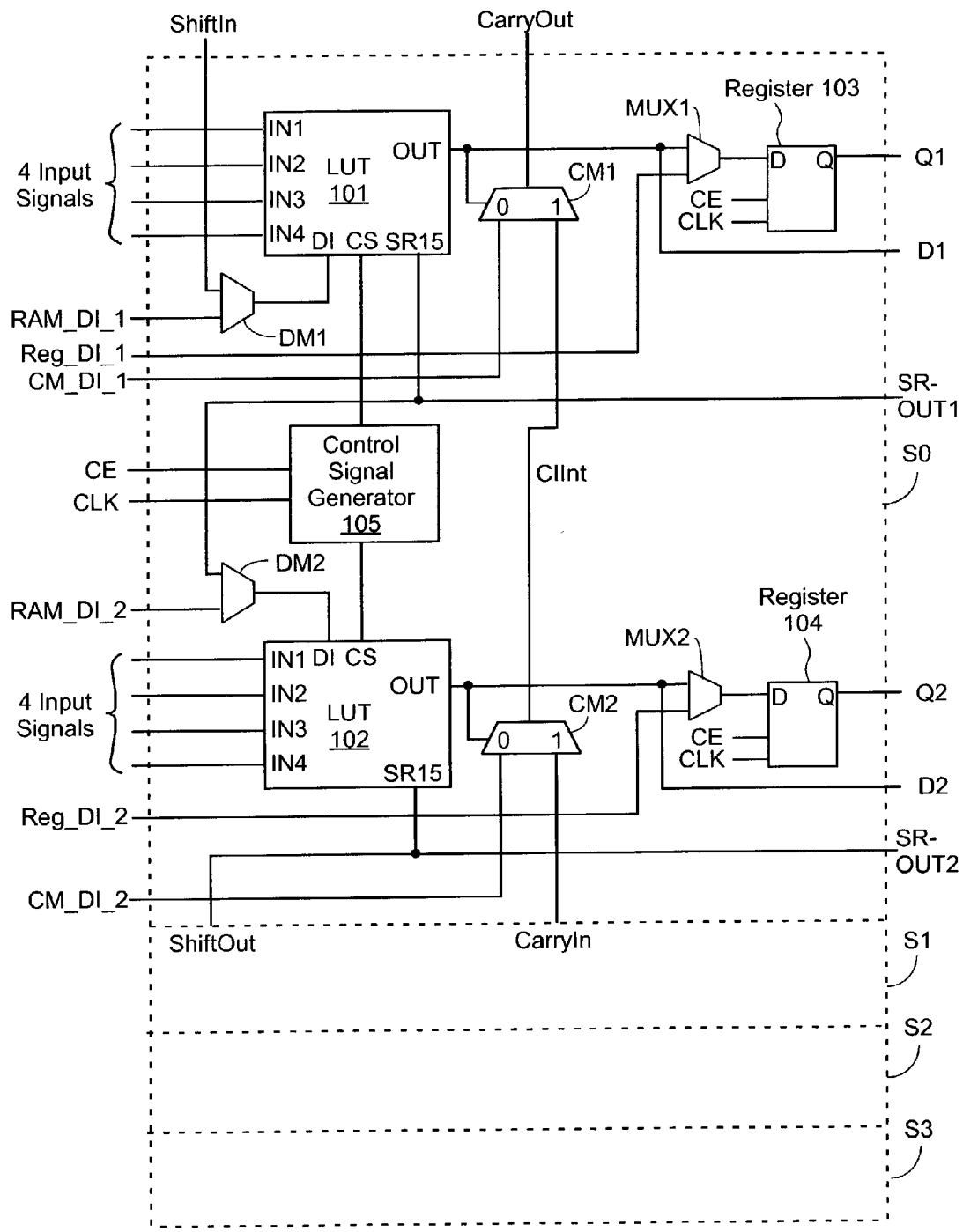
FIG. 1 is a simplified diagram of a Virtex-II configuration logic block (CLB).
Figure 2:
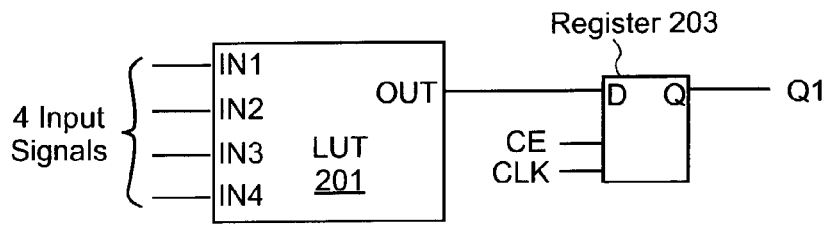
FIG. 2 shows a portion of the CLB of FIG. 1 that is used in traditional testing methods for lookup tables (LUTs).
Figure 3:
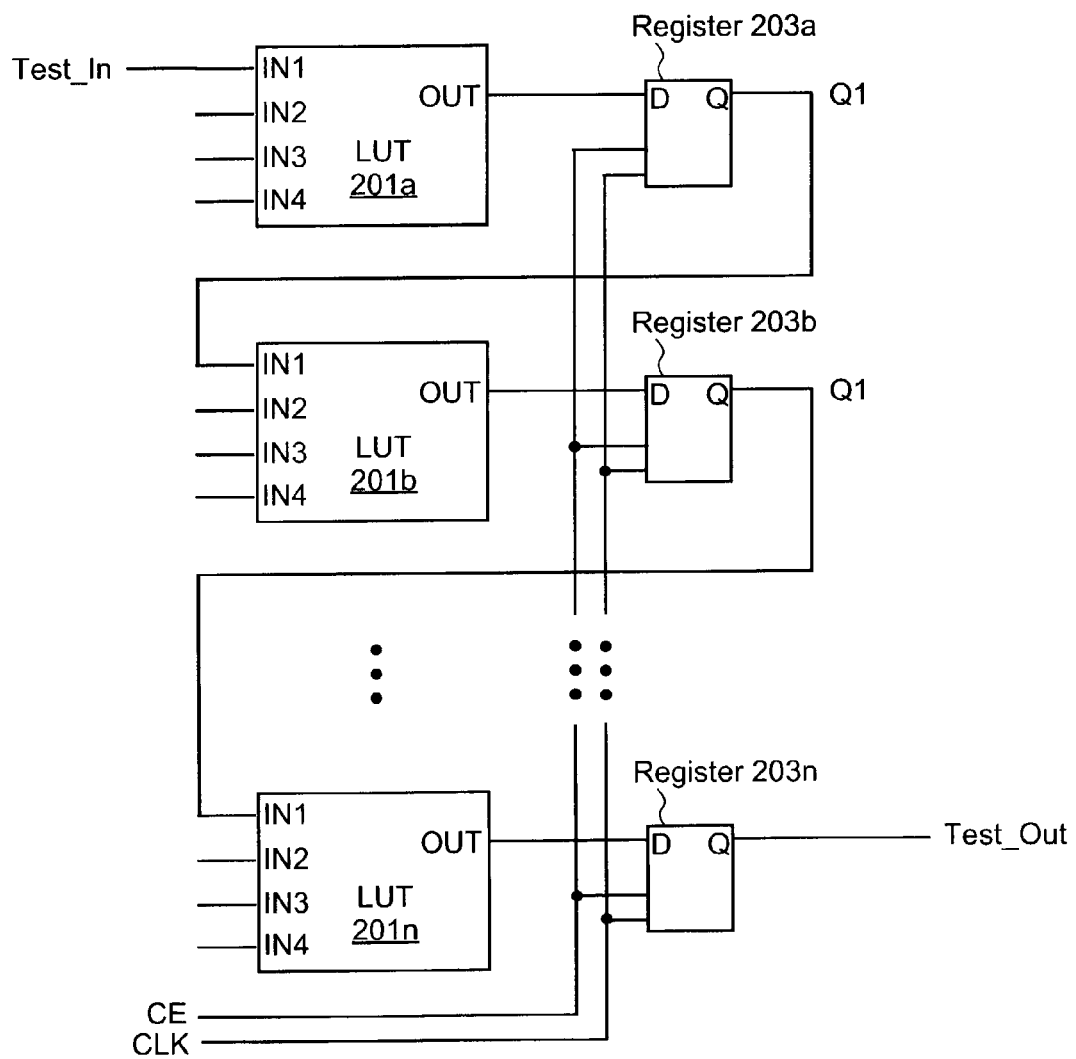
FIG. 3 shows how the circuit of FIG. 2 is traditionally used in a LUT testing process.

In step 911, the carry chain is configured to perform a wide AND function by presenting a low value at the CM_DI_1 or CM_DI_2 input terminal of the circuit (see FIG. 1). In step 912, the four input signals of each LUT are cycled through all 16 possible combinations of values. Thus, each memory cell in the LUT memory array is tested in turn, while monitoring and comparing the carry chain output signal to the expected value. In some embodiments, the monitoring is performed by a logical XOR gate implemented using another LUT of the PLD. If an error is detected, a faulty PLD is reported (step 912a).

In step 913, the carry chain is configured to perform a wide OR function by presenting a high value at the CM_DI_1 or CM_DI_2 input terminal of the circuit (see FIG. 1). In step 914, the four input signals of each LUT are again cycled through all possible combinations of values while monitoring the output of the carry chain. If an error is detected, a faulty PLD is reported (step 914a).

In step 921, eight shift commands are applied to each LUT, changing the first bit pattern in each LUT (0x6996) to a second bit pattern complementary to the first bit pattern (0x9669). In step 922, steps 911–914 are repeated with the second bit pattern stored in the LUTs.

Those having skill in the relevant arts of the invention will now perceive various modifications and additions that can be made as a result of the disclosure herein. For example, the above text describes the circuits and methods of the invention in the context of field programmable gate arrays (FPGAs) such as the Virtex-II FPGA. However, the circuits and methods of the invention can also be implemented in other programmable logic devices (PLDs).

Further, lookup tables (LUTs), multiplexers, registers, control signal generators, slices, CLBs, carry chains, carry multiplexers, logical XOR gates, logical OR gates, inverters and other components other than those described herein can be used to implement the invention. Active-high signals can be replaced with active-low signals by making straightforward alterations to the circuitry, such as are well known in the art of circuit design. Logical circuits can be replaced by their logical equivalents by appropriately inverting input and output signals, as is also well known.

Moreover, some components are shown directly connected to one another while others are shown connected via intermediate components. In each instance the method of interconnection establishes some desired electrical communication between two or more circuit nodes. Such communication can often be accomplished using a number of circuit configurations, as will be understood by those of skill in the art.

Accordingly, all such modifications and additions are deemed to be within the scope of the invention, which is to be limited only by the appended claims and their equivalents.

What is claimed is:

1. A method of testing a programmable logic device (PLD), the PLD including a plurality of lookup tables (LUTs) and an associated carry chain, each LUT having K inputs, where K is an integer, the carry chain comprising a chain of carry multiplexers and providing a carry chain output signal, wherein each carry multiplexer in the carry chain is controlled by an output signal from one of the LUTs, the method comprising:
   a) storing a first bit pattern in each LUT;
   b) configuring the carry chain to perform a wide AND function of the output signals of the LUTs;
   c) cycling, after configuring the carry chain to perform a wide AND function, the K inputs of each LUT through all possible input combinations while comparing the carry chain output signal to an expected value and reporting the PLD faulty if the carry chain output signal differs from the expected value;

d) configuring the carry chain to perform a wide OR function;

e) cycling, after configuring the carry chain to perform a wide OR function, the K LUT inputs of each LUT through all possible input combinations while comparing the carry chain output signal to an expected value and reporting the PLD faulty if the carry chain output signal differs from the expected value;

f) storing a second bit pattern in each LUT, wherein the second bit pattern is the complement of the first bit pattern; and g) repeating steps (b) through (e).

2. The method of claim 1, wherein each LUT has a shift register mode, the method further comprising:

configuring the PLD to form a recirculating shift path through the LUTs; and wherein storing the second bit pattern in each LUT comprises providing one or more shift commands to each LUT until the LUT stores the second bit pattern.

3. The method of claim 1, wherein each LUT has a RAM mode, and wherein storing the second bit pattern in each LUT comprises performing a series of memory writes to each LUT.

4. The method of claim 1, wherein storing the second bit pattern in each LUT comprises performing a partial reconfiguration of the PLD.

5. The method of claim 1, wherein storing the second bit pattern in each LUT comprises performing a full reconfiguration of the PLD.

6. The method of claim 1, wherein steps (d) and (e) are performed before performing steps (b) and (c).

7. The method of claim 1, wherein the first bit pattern configures each LUT to perform an XOR function and the second bit pattern configures each LUT to perform an XNOR function.

8. The method of claim 7, wherein K is four, the first bit pattern is 0x6996, and the second bit pattern is 0x9669.

9. The method of claim 1, wherein K is four.

10. The method of claim 1, wherein the LUTs comprise a column of adjacent LUTs.

11. A circuit implemented in a programmable logic device (PLD), the circuit comprising:

a shift control input terminal;

an AND/OR input terminal;

a first circuit output terminal;

an inverter having an input terminal coupled to the AND/OR input terminal and an output terminal;

a first lookup table (LUT) configured in shift mode and having a shift in terminal, a shift out terminal, a control terminal coupled to the shift control input terminal of the circuit, an output terminal, and K input terminals, where K is an integer;

a first carry multiplexer having a select terminal coupled to the output terminal of the first LUT, a first data input terminal coupled to the AND/OR input terminal of the circuit, a second data input terminal, and an output terminal coupled to the first circuit output terminal;

a second LUT configured in shift mode and having a shift in terminal coupled to the shift out terminal of the first LUT, a shift out terminal coupled to the shift in terminal of the first LUT, a control terminal coupled to the shift control input terminal of the circuit, an output terminal, and K input terminals coupled to the K input terminals of the first LUT; and a second carry multiplexer having a select terminal coupled to the output terminal of the second LUT, a first data input terminal coupled to the AND/OR input terminal of the circuit, a second data input terminal coupled to the output terminal of the inverter, and an output terminal coupled to the second data input terminal of the first carry multiplexer.

12. The circuit of claim 11, wherein the first and second LUTs form at least a portion of a column of LUTs within the PLD.

13. The circuit of claim 11, further comprising a control signal generator having clock and clock enable input terminals and an output terminal coupled to the shift control input terminal of the circuit.

14. The circuit of claim 11, further comprising:

an error detect output terminal;

a third LUT coupled between the shift out terminal of the second LUT and the shift in terminal of the first LUT, the third LUT being configured in shift mode and having a shift in terminal coupled to the shift out terminal of the second LUT, a shift out terminal coupled to the shift in terminal of the first LUT, a control terminal coupled to the shift control input terminal of the circuit, an output terminal, and K input terminals coupled to the K input terminals of the first LUT; and a logical XOR gate having input terminals coupled to the output terminal of the third LUT and the first circuit output terminal and further having an output terminal coupled to the error detect output terminal of the circuit.

15. The circuit of claim 14, wherein the first, second, and third LUTs form at least a portion of a column of LUTs within the PLD.

16. The circuit of claim 11, further comprising:

a second circuit output terminal;

a third LUT configured in shift mode and having a shift in terminal, a shift out terminal, a control terminal coupled to the shift control input terminal of the circuit, an output terminal, and K input terminals coupled to the K input terminals of the first LUT;

a third carry multiplexer having a select terminal coupled to the output terminal of the third LUT, a first data input terminal coupled to the AND/OR input terminal of the circuit, a second data input terminal, and an output terminal coupled to the second circuit output terminal;

a fourth LUT configured in shift mode and having a shift in terminal coupled to the shift out terminal of the third LUT, a shift out terminal coupled to the shift in terminal of the third LUT, a control terminal coupled to the shift control input terminal of the circuit, an output terminal, and K input terminals coupled to the K input terminals of the first LUT; and a fourth carry multiplexer having a select terminal coupled to the output terminal of the fourth LUT, a first data input terminal coupled to the AND/OR input terminal of the circuit, a second data input terminal coupled to the output terminal of the inverter, and an output terminal coupled to the second data input terminal of the third carry multiplexer.

17. The circuit of claim 16, wherein the first and second LUTs form at least a portion of a first column of LUTs within the PLD, and the third and fourth LUTs form at least a portion of a second column of LUTs within the PLD.

18. The circuit of claim 16, further comprising:

an error detect output terminal;

a fifth LUT coupled between the shift out terminal of the second LUT and the shift in terminal of the first LUT, the fifth LUT being configured in shift mode and having a shift in terminal coupled to the shift out terminal of the second LUT, a shift out terminal coupled to the shift in terminal of the first LUT, a control terminal coupled to the shift control input terminal of the circuit, an output terminal, and K input terminals coupled to the K input terminals of the first LUT;

a first logical XOR gate having input terminals coupled to the output terminal of the fifth LUT and the first circuit output terminal and further having an output terminal;

a sixth LUT coupled between the shift out terminal of the fourth LUT and the shift in terminal of the third LUT, the sixth LUT being configured in shift mode and having a shift in terminal coupled to the shift out terminal of the fourth LUT, a shift out terminal coupled to the shift in terminal of the third LUT, a control terminal coupled to the shift control input terminal of the circuit, an output terminal, and K input terminals coupled to the K input terminals of the first LUT;

a second logical XOR gate having input terminals coupled to the output terminal of the sixth LUT and the second circuit output terminal and further having an output terminal; and a logical OR gate having first and second input terminals coupled to the output terminals of the first and second logical XOR gates, and further having an output terminal coupled to the error detect output terminal of the circuit.

19. The circuit of claim 18, wherein the first, second, and fifth LUTs form at least a portion of a first column of LUTs within the PLD, and the third, fourth, and sixth LUTs form at least a portion of a second column of LUTs within the PLD.

20. The circuit of claim 11, wherein K is four.

21. A method of testing a programmable logic device (PLD), the PLD including a plurality of lookup tables (LUTs) and an associated carry chain, each LUT having K inputs, where K is an integer, the carry chain comprising a chain of carry multiplexers and providing a carry chain output signal, wherein each carry multiplexer in the carry chain is controlled by an output signal from one of the LUTs, the method comprising:

storing a first bit pattern in each LUT;

configuring the carry chain to perform a wide AND function of the output signals of the LUTs;

cycling, after configuring the carry chain to perform a wide AND function, the K inputs of each LUT through all possible input combinations while comparing the carry chain output signal to an expected value and reporting the PLD faulty if the carry chain output signal differs from the expected value;

storing a second bit pattern in each LUT, wherein the second bit pattern is the complement of the first bit pattern; and cycling, after storing the second bit pattern in each LUT, the K inputs of each LUT through all possible input combinations while comparing the carry chain output signal to an expected value and reporting the PLD faulty if the carry chain output signal differs from the expected value.

22. The method of claim 21, wherein each LUT has a shift register mode, the method further comprising:

configuring the PLD to form a recirculating shift path through the LUTs; and wherein storing the second bit pattern in each LUT comprises providing one or more shift commands to each LUT until the LUT stores the second bit pattern.

23. The method of claim 21, wherein each LUT has a RAM mode, and wherein storing the second bit pattern in each LUT comprises performing a series of memory writes to each LUT.

24. The method of claim 21, wherein storing the second bit pattern in each LUT comprises performing a partial reconfiguration of the PLD.

25. The method of claim 21, wherein storing the second bit pattern in each LUT comprises performing a full reconfiguration of the PLD.

26. The method of claim 21, wherein the steps are performed in the order shown in claim 21.

27. The method of claim 21, wherein the first bit pattern configures each LUT to perform an XOR function and the second bit pattern configures each LUT to perform an XNOR function.

28. The method of claim 27, wherein K is four, the first bit pattern is 0x6996, and the second bit pattern is 0x9669.

29. The method of claim 21, wherein K is four.

30. The method of claim 21, wherein the LUTs comprise a column of adjacent LUTs.

31. A method of testing a programmable logic device (PLD), the PLD including a plurality of lookup tables (LUTs) and an associated carry chain, each LUT having K inputs, where K is an integer, the carry chain comprising a chain of carry multiplexers and providing a carry chain output signal, wherein each carry multiplexer in the carry chain is controlled by an output signal from one of the LUTs, the method comprising:

storing a first bit pattern in each LUT;

configuring the carry chain to perform a wide OR function of the output signals of the LUTs;

cycling, after configuring the carry chain to perform a wide OR function, the K inputs of each LUT through all possible input combinations while comparing the carry chain output signal to an expected value and reporting the PLD faulty if the carry chain output signal differs from the expected value;

storing a second bit pattern in each LUT, wherein the second bit pattern is the complement of the first bit pattern; and cycling, after storing the second bit pattern in each LUT, the K inputs of each LUT through all possible input combinations while comparing the carry chain output signal to an expected value and reporting the PLD faulty if the carry chain output signal differs from the expected value.

32. The method of claim 31, wherein each LUT has a shift register mode, the method further comprising:

configuring the PLD to form a recirculating shift path through the LUTs; and wherein storing the second bit pattern in each LUT comprises providing one or more shift commands to each LUT until the LUT stores the second bit pattern.

33. The method of claim 31, wherein each LUT has a RAM mode, and wherein storing the second bit pattern in each LUT comprises performing a series of memory writes to each LUT.

34. The method of claim 31, wherein storing the second bit pattern in each LUT comprises performing a partial reconfiguration of the PLD.

35. The method of claim 31, wherein storing the second bit pattern in each LUT comprises performing a full reconfiguration of the PLD.

36. The method of claim 31, wherein the steps are performed in the order shown in claim 31.

37. The method of claim 31, wherein the first bit pattern configures each LUT to perform an XOR function and the second bit pattern configures each LUT to perform an XNOR function.

38. The method of claim 37, wherein K is four, the first bit pattern is 0x6996, and the second bit pattern is 0x9669.

39. The method of claim 31, wherein K is four.

40. The method of claim 31, wherein the LUTs comprise a column of adjacent LUTs.

* * * * *